Feb. 23, 1965          J. IMPERIAL          3,170,755
SYSTEM FOR PHOTOGRAPHICALLY RECORDING OSCILLOSCOPIC TRACES
Filed March 6, 1962
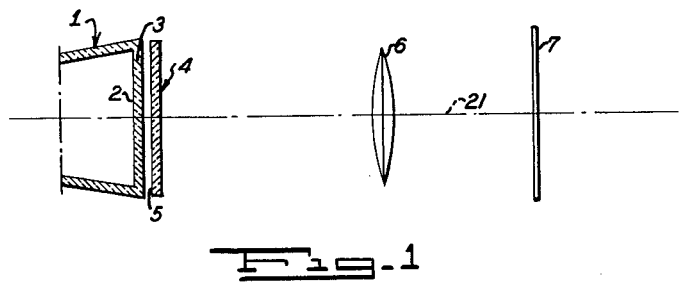
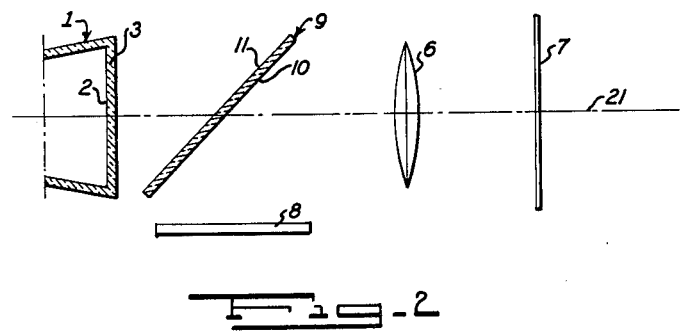
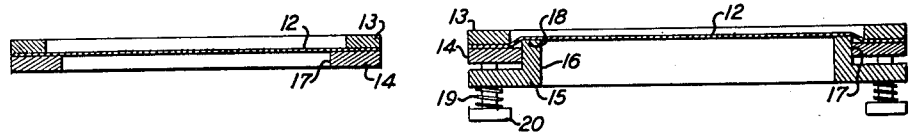
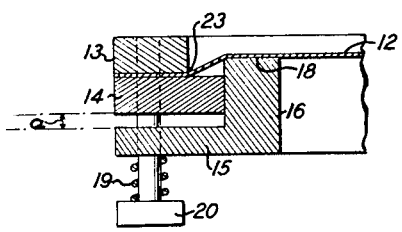
INVENTOR
JEAN IMPERIAL

3,170,755
SYSTEM FOR PHOTOGRAPHICALLY RECORDING OSCILLOSCOPIC TRACES

Jean Imperial, Montrouge, France, assignor to "Ribet et Desjardins," Montrouge, Seine, France, a corporation of France
Filed Mar. 6, 1962, Ser. No. 177,856
Claims priority, application France, Mar. 13, 1961, 855,378
4 Claims. (Cl. 346—110)

My invention relates to the photographic recording of traces whether transient or otherwise, appearing on the screen of an oscilloscope. Such records are being used on an increasing scale.

The photographic recording by means of a suitable optical system of a trace appearing on the flat screen of an oscilloscope does not meet any particular difficulty in its execution.

However, in many cases, it is essential to photograph, in addition to the trace on the screen, a network of straight lines extending in two orthogonal directions so as to correspond for instance to coordinate axes, and thereby allow the measurement of the recorded traces. Said network of straight lines is engraved on, or carried by, a flat transparent plate which is called the graticule.

A simple known solution for simultaneously recording the trace on the screen and the lines of the graticule consists in setting the transparent plate or graticule a very short distance from the screen of the cathode ray tube parallel with said screen, the system of crossed lines of the network being drawn on one of the surfaces of said plate. However, such an arrangement does not permit obtaining a sharp image of both the trace and the network.

It is an object of the invention to provide improved apparatus which furnishes a projected image of the network and the trace in sharp focus.

It is a further object of the invention to provide improved apparatus which operates as above under varying conditions of temperature and humidity.

In the accompanying drawings:

FIG. 1 is a diagrammatic showing of this prior arrangement of the system of crossed lines and of the cathode ray tube screen;

FIG. 2 is a modification thereof also known in the art,

FIGS. 3 and 4 illustrate the invention;

FIG. 5 is a view on a larger scale of a part of FIG. 4.

In FIG. 1, the end of a cathode ray tube is shown at 1, while its flat screen extends over said end on the inner surface of a glass plate 3. The transparent plate 4 to the front of said screen carries on its surface 5 facing the screen the graticule while 6 designates diagrammatically the optical system and 7 the plane in which the photographic plate or film to be impressed lies. 21 designates the axis of the optical system 6 which axis registers with that of the tube 1.

Unfortunately, this very simple solution is imperfect by reason of the fact that the depth of field of the optical system 6 is clearly smaller than the distance separating the plane 2 of the screen from the plane 5 containing the lines drawn on the plate 4. The arrangement therefore is not satisfactory, since it does not supply simultaneously a clear picture of the graticule and a clear picture of the trace to be recorded.

In a known attempt for removing this difficulty the graticule is placed in a plane parallel with the axis of the luminous beam passing from the screen and its virtual image is projected on the photographic film or plate, through the agency of a semi-reflecting semi-transparent sheet of glass arranged at 45° with reference to the axis of the luminous beam extending from the screen of the cathode ray tube to the photographic plate or film.

This known solution is illustrated diagrammatically in FIG. 2, wherein the tube 1 is shown as before with its screen 2, the optical system 6 and the photographic plate or film 7. In the case of FIG. 2, the graticule 8 is arranged in a plane parallel with the axis 21 of the luminous rays.

A non-silvered plate glass 9 is arranged at 45° with reference to the axis 21 and in accordance with a well-known technique, it is semi-transparent to permit the light from the screen 2 to pass through it and reach the optical system and the photographic plate or film 7 while its surface 10 facing the graticule 8 is semi-reflecting so that the luminous rays from the graticule may be reflected by surface 10 and also reach the photographic plate or film after having first passed through the optical system 6.

The arrangement is such that the image of the network of the graticule 8 is reflected by the surface 10 so as to appear in the plane of the screen 2 whereby the drawback due to insufficient depth of field is completely eliminated. This is obtained by arranging the plate 9 along the angle bisector between the screen and the graticule 8.

However, this solution shows other drawbacks, to wit:

The luminous rays from the screen 2 are reflected partly inside the plate 9 which leads to an absorption of light and thereby is a duplication of the image of the trace;

Furthermore, the luminous rays of the graticule 8 partly enter the plate 9, and are reflected by the rear surface of said plate and pass out of the plate so as to form a further image on the film or plate 7. Consequently, there is also a duplication of the image of the graticule and in fact, there can sometimes be obtained three systems of images, which makes the examination of the recording a difficult matter, since it is impossible to ascertain which of these pictures should be selected as a reference.

It has been attempted to eliminate this drawback, for instance by optically treating the surface 11 of the plate 9, so as to eliminate any parasitic reflections or refractions. However, this last solution has not been satisfactory and furthermore, leads to a substantial increase in the cost price of the apparatus as well as to an increase of the absorption of light from the trace to be recorded.

The present invention eliminates the different drawbacks referred to hereinabove by resorting to the arrangement of FIG. 2, in which the glass plate 9 has been replaced by a very thin sheet of material having a thickness of a few hundredths of a millimeter. The material may be a transparent plastic material or a synthetic resin subjected to a suitable stabilizing treatment, so that its size may vary only very slightly with the modifications in the conditions of the medium in which it is placed such as temperature and moisture content.

There is presently available, in particular for photographic purposes, transparent sheets of this type, for instance of polyester, which have after suitable treatment, the desired optical properties and stability.

However, the use of such a sheet cannot lead per se to satisfactory results, since the residual modifications in size of the sheet under the action of the medium in which it lies, may still be sufficient to prevent its practical use.

Consequently, and in accordance with the invention, the use of a sheet of a material of the type referred to is associated with supporting means which compensate for these residual modifications so that, whatever may be the modifications in the properties of the medium in which the sheet lies, the latter remains flat and stretched and constantly lies in a plane which is absolutely stationary in space with reference to the cathode ray tube and the optical system of the apparatus.

FIGS 3, 4, 5 show the improved assembly according to the invention and more specifically FIG. 3 shows the sheet secured between two flanges while FIG. 4 shows the arrangement of the sheet and of the flanges carrying it fitted on a member secured to the frame of the apparatus, by assembling means which ensure the tensioning of the sheet which is held taut in a plane the position of which is unvariable with reference to the apparatus.

As illustrated, the sheet 12 which is to be substituted for the glass-plate 9 is first secured between the cooperating flat surfaces of two flanges 13 and 14 in the form of metal annulus members. The sheet 12 is of a substantially circular shape and the flanges 13 and 14 have corresponding shapes. Said flanges 13 and 14 are clamped against each other through any suitable means, so as to form a mechanical unit holding the sheet in substantially flat condition, while the inner diameter of the lower flange 14 is smaller than the inner diameter of the upper flange 13.

Said system constituted by sheet 12 and flanges 13 and 14 may slide to a reduced extent over a metal carrier body of revolution 15 (FIG. 4) also in the shape of an annulus and provided with an inner flange 16. The flange 14 slides along the outer surface of flange 18 such that the inner periphery 17 of the flange 14 slides in a direction parallel with its axis.

Said flange 16 serves thus as a guiding surface for the system 12, 13, 14. Furthermore, the upper surface 18 of said flange 16 is carefully trued and defines materially the plane in which the sheet 12 is to lie; said flange 18 engages therefore the sheet 12 along an annular peripheral area and it is urged against said sheet by means of springs 19 acting against the lower surface of the carrier body 15 and against the heads of bolts 20 passing through suitable bores in the body 15 and secured to the superposed flanges 13 and 14.

There may be provided, for instance, a plurality of angularly arranged bolts 20 along the periphery of the flanges so that the body 15 may exert a uniform pressure on the sheet 12 throughout its periphery.

FIG. 5 shows on an enlarged scale, a part of the flanges 13 and 14 and of the body 15 with its flange 16 the surface 18 of which engages the sheet 12.

By reason of this engagement, the marginal section of the sheet 12 assumes an oblique position between the inner edge of the flange 13 registering with the flange 14 and the outer edge of the surface 18 on the flange 16.

The size of the parts is such that there is always a clearance $a$ as illustrated between the lower surface of the flange 14 and the upper surface of the main body of the flange 15 while on the other hand, the plane defined by the surface 18 is always raised as shown by the drawing, with reference to the plane of contact between the flanges 13 and 14, which plane contains the edge 23, and this, as will be readily ascertained, ensures a perfect tensioning of the sheet 12 whereby said sheet rests always over the surface 18 forming the reference plane.

On the other hand, the body 15 is in its turn secured rigidly to the frame of the apparatus, in a manner such that the sheet 12 occupies exactly the same spatial position.

The elasticity of the springs 19 ensures a compensation of any dimensional variation of the sheet 12 as a result of changes of atmospheric conditions.

The solution provided by the invention provides highly satisfactory results and, furthermore, solves in a particularly economical manner, the problem of stability, since it eliminates optical fluorination treatment.

Furthermore, the arrangement of the graticule on one side of the apparatus allows its easy replacement, without it being necessary to dismantle the whole recording system.

Furthermore, my invention allows observing directly through a mirror arranged in a plane parallel with that of the sheet 12 both the screen, as a virtual picture projected on the plane of the graticule, and the graticule itself which is observed directly through the sheet 12, and this allows executing any necessary adjustments, and also the starting of the recording operation at any desired moment.

The invention is particularly applicable to cathode ray tubes the screen of which has a diameter of 13 cm. or more.

Obviously, many detail modifications may be brought to the embodiment described hereinabove without unduly widening the scope of the invention as defined in the accompanying claims and in particular, the tensioning of the sheet 12 may be obtained through other means.

What I claim is:

1. Apparatus for superimposing two images which are projected along mutually perpendicular axes which intersect each other comprising a thin sheet of material having a semi-transparent surface for facing one of said images and a semi-reflective surface for facing the other of said images and means supporting said sheet in a fixed plane which is specifically oriented with respect to said images to pass superposed images, the latter said means including resilient means holding said sheet taut in said fixed plane even for dimensional changes of said sheet, a pair of members peripherally engaging the sheet therebetween, a flange member having a planar surface which defines said fixed plane, said pair of members encircling said flange member and holding the sheet supported on the surface thereof, said resilient means acting between said flange member and said pair of members in a direction perpendicular to said planar surface to bias said pair of members and cause the same to assume a position in which the sheet is maintained taut and supported against the planar surface of the flange member, said pair of members being annular members which grip the sheet therebetween, said flange member including an inner flange which is encircled by said annular pair of members and an outwardly projecting flange on said inner flange, said inner flange having an upper surface which is the aforementioned planar surface, said outwardly projecting flange facing said pair of members, means secured to said pair of members and slidably supported in said outwardly projecting flange for movement in a direction perpendicular to said planar surface, said resilient means including a spring between said outwardly directed flange and the means secured to the pair of members for urging said pairs of members to a neutral position in which the pair of members draws said sheet against the planar surface of the inner flange and then obliquely downwardly.

2. Apparatus for superimposing two images which are projected along mutually perpendicular axes which intersect each other comprising a thin sheet of material including a semi-transparent surface for facing one of said images, and a semi-reflective surface for facing the other of said images, means supporting said sheet in a fixed plane which is specifically oriented with respect to said images to pass superposed images, the latter said means including resilient means holding said sheet taut in said fixed plane even for dimensional changes of said sheet, a pair of annular members peripherally engaging the sheet therebetween, a flange member having an inner flange with an upper planar surface which defines said fixed plane, said pair of members encircling the inner flange of the flange member and holding the sheet in supported relation on the surface of the inner flange, said flange member including an outwardly projecting flange extending perpendicularly from the inner flange and facing the annular members, a plurality of angularly arranged members secured to the annular members, said outwardly projecting flange of the flange member being provided with a corresponding plurality of bores in which said angularly arranged members are slidably supported for movement in a direction perpendicular to said planar surface, and enlarged portions on said angularly arranged members located on a side of the outwardly directed flange which is opposite the pair of members, said resilient means including a spring for each of the angularly arranged members supported between the enlarged portion of the associated angularly arranged members and the outwardly directed flange of the flange member.

3. Image superimposing apparatus comprising a thin sheet of material including a semitransparent surface portion and a semi-reflective surface portion and means supporting said sheet in a fixed plane which is specifically oriented with respect to images to pass superposed images, the latter said means including resilient means holding said sheet taut in said fixed plane even for dimensional changes of said sheet, a pair of members peripherally engaging the sheet therebetween, a flange member having a planar surface which defines said fixed plane, said pair of members encircling said flange member and holding the sheet supported on the surface thereof, said resilient means acting between said flange member and said pair of members in a direction perpendicular to said planar surface to bias said pair of members and cause the same to assume a position in which the sheet is maintained taut and supported against the planar surface of the flange member, said pair of members being annular members which grip the sheet therebetween, said flange member including an inner flange which is encircled by said annular pair of members and an outwardly projecting flange on said inner flange, said inner flange having an upper surface which is the aforementioned planar surface, said outwardly projecting flange facing said pair of members, means secured to said pair of members and slidably supported in said outwardly projecting flange for movement in a direction perpendicular to said planar surface, said resilient means including a spring between said outwardly directed flange and the means secured to the pair of members for urging said pair of members to a neutral position in which the pair of members draws said sheet against the planar surface of the inner flange and then obliquely downwardly.

4. Image superimposing apparatus comprising a thin sheet of material including a semi-transparent surface portion and a semi-reflective surface portion means supporting said sheet in a fixed plane which is specifically oriented with respect to images to pass superposed images, the latter said means including resilient means holding said sheet taut in said fixed plane even for dimensional changes of said sheet, a pair of annular members peripherally engaging the sheet therebetween, a flange member having an inner flange with an upper planar surface which defines said fixed plane, said pair of members encircling the inner flange of the flange member and holding the sheet in supported relation on the surface of the inner flange, said flange member including an outwardly projecting flange extending perpendicularly from the inner flange and facing the annular members, a plurality of angularly arranged members secured to the annular members, said outwardly projecting flange of the flange member being provided with a corresponding plurality of bores in which said angularly arranged members are slidably supported for movement in a direction perpendicular to said planar surface, and enlarged portions on said angularly arranged members located on a side of the outwardly directed flange which is opposite the pair of members, said resilient means including a spring for each of the angularly arranged members supported between the enlarged portion of the associated angularly arranged members and the outwardly directed flange of the flange member.

References Cited by the Examiner
UNITED STATES PATENTS

| | | | |
|---|---|---|---|
| 1,895,555 | 1/33 | Reckmeier | 88—1 |
| 2,422,376 | 6/47 | Turner et al. | 88—1 |
| 2,570,273 | 10/51 | Pryor | 156—108 |
| 2,787,187 | 4/57 | Rantsch | 88—1 |
| 2,795,164 | 6/57 | Hendrix | 88—1 |
| 2,887,927 | 5/59 | Newton | 88—14 X |
| 2,911,879 | 11/59 | Giwosky | 88—14 |
| 2,923,590 | 2/60 | Lorenz | 346—110 |
| 2,951,736 | 9/60 | Black | 346—1 |
| 2,963,652 | 12/60 | Taylor et al. | 324—158 |
| 2,984,537 | 5/61 | Jarvis et al. | 346—110 |
| 2,992,876 | 7/61 | Ellis | 346—110 |
| 3,025,125 | 3/62 | Walker | 346—110 |

FOREIGN PATENTS 440,006   12/35   Great Britain.

LEO SMILOW, *Primary Examiner.*
LEYLAND M. MARTIN, *Examiner.*